(12) United States Patent
Dauzat et al.

(10) Patent No.: US 10,833,489 B2
(45) Date of Patent: *Nov. 10, 2020

(54) ENCLOSURE FOR ELECTRICAL NETWORK PROTECTION ELEMENT

(71) Applicant: GENERAL ELECTRIC COMPANY, Schenectady, NY (US)

(72) Inventors: Thomas Ambrose Dauzat, Shreveport, LA (US); Cecilia Espinoza Diaz, Nuevo Leon (MX); Luis Sanchez Cabral, Nuevo Leon (MX)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,367

(22) Filed: Oct. 1, 2019

(65) Prior Publication Data

US 2020/0106247 A1 Apr. 2, 2020

Related U.S. Application Data

(62) Division of application No. 15/845,077, filed on Dec. 18, 2017, now Pat. No. 10,587,100.

(51) Int. Cl.
*H02B 1/28* (2006.01)
*H02B 1/48* (2006.01)
*H02B 1/38* (2006.01)
*H02B 1/46* (2006.01)

(52) U.S. Cl.
CPC ............... *H02B 1/28* (2013.01); *H02B 1/38* (2013.01); *H02B 1/46* (2013.01)

(58) Field of Classification Search
None
See application file for complete search history.

(56) References Cited

U.S. PATENT DOCUMENTS

| | | | |
|---|---|---|---|
| 5,199,369 A * | 4/1993 | Meyer | B63B 43/32 114/117 |
| 5,421,229 A | 6/1995 | Grossmann et al. | |
| 5,992,098 A | 11/1999 | Flider et al. | |
| 6,421,229 B1 * | 7/2002 | Campbell | H02B 1/03 361/622 |
| 6,640,498 B1 * | 11/2003 | Groeneveld | B63B 43/32 49/395 |

(Continued)

*Primary Examiner* — Courtney L Smith
(74) *Attorney, Agent, or Firm* — Eversheds Sutherland (US) LLP

(57) ABSTRACT

The disclosure generally relates to an exemplary enclosure that can house an electrical network protection element and provide protection to the electrical network protection element against damage in various environments such as when the enclosure is placed in an underground vault that may be flooded during rain, or when a liquid (oil, for example) comes in contact with the enclosure. The enclosure includes a flange attached to the housing and two doors that are hingeably attached to the flange. A wedge projection is provided along the perimeter of the flange and a gasket is provided on three outer edges of each door. The gasket sealingly receives the wedge projection of the flange when the doors are closed. The first door further includes a beveled inner edge that sealingly mates with a gasket in a complementary beveled inner edge of the second door when the doors are closed.

5 Claims, 8 Drawing Sheets

(56) References Cited

U.S. PATENT DOCUMENTS

| | | |
|---|---|---|
| 9,379,526 B2 * | 6/2016 | Bier .................. H02B 1/38 |
| 10,587,100 B2 * | 3/2020 | Dauzat ................ H02B 1/28 |
| 2003/0001465 A1 | 1/2003 | Carter et al. |
| 2013/0293076 A1 * | 11/2013 | Karandikar .......... H02B 1/28 |
| | | 312/296 |
| 2015/0075080 A1 * | 3/2015 | Ellingson ............ E06B 7/2309 |
| | | 49/483.1 |
| 2015/0282363 A1 | 10/2015 | Bruce et al. |
| 2018/0139859 A1 * | 5/2018 | Reese ................ H02B 1/28 |
| 2019/0190241 A1 * | 6/2019 | Dauzat ................ H02J 3/14 |

* cited by examiner

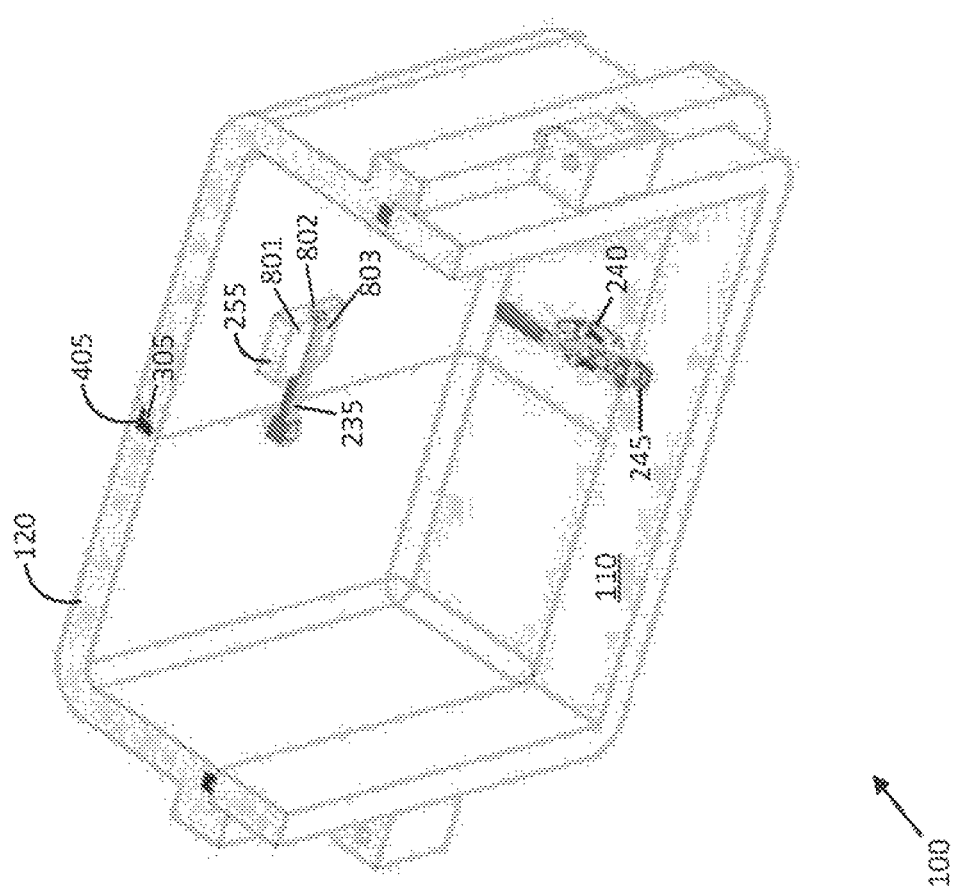

ENCLOSURE FOR ELECTRICAL NETWORK PROTECTION ELEMENT

CROSS-REFERENCE TO RELATED APPLICATIONS

This application is a divisional of and claims the priority benefit of U.S. application Ser. No. 15/845,077, filed Dec. 18, 2017, which is incorporated herein by reference.

FIELD OF THE DISCLOSURE

This disclosure relates to enclosures, and more particularly, to an enclosure for housing an electrical network protection element.

BACKGROUND OF THE DISCLOSURE

An electrical protection element such as a circuit breaker or a fuse is typically used to protect a circuit, a device, or a system from being damaged due to an abnormal condition such as an over-voltage condition or an over-current condition. The characteristics of the electrical protection element are defined in large part by the nature of the application where the electrical protection element is used. Thus, a small fuse may be adequate to protect an electronic circuit board while a heavy-duty circuit breaker may be required to protect a transformer in an electric utility facility. Furthermore, the fuse used in the electronic circuit board may be selected without any undue attention being paid to a waterproofing aspect of the fuse. On the other hand, the heavy-duty circuit breaker may require specific attention to be paid to environmental factors such as temperature, humidity, and moisture, because the transformer may be exposed to natural elements such as the sun, rain, and snow. Consequently, in such applications, the electrical protection element may be placed inside a protective housing such as a utility hut or a water-proof enclosure.

In some cases, an electrical protection element may be housed inside a water-proof enclosure that is installed inside an underground structure. While it is expected that water would not normally flow into the underground structure, in some situations such as during heavy rainfall, water may enter the underground structure. The water-proof enclosure must therefore be constructed to prevent this water from coming in contact with the electrical protection element.

In some other cases, an electrical protection element may be housed inside a water-proof enclosure that is submerged under water, such as a body of water. Here again, the water-proof enclosure must be constructed to prevent water from coming in contact with the electrical protection element.

The water-proof enclosure must however, allow a person such as a technician, to open the water-proof enclosure in order to gain access to the electrical protection element for various reasons, such as to replace parts or to make a visual inspection of the electrical protection element. Consequently, such conflicting requirements should be taken into consideration when designing a water-proof enclosure. Some conventional solutions fail to satisfy at least some of these conflicting requirements, thereby exposing the electrical protection element to potential damage and/or making it difficult for a technician to access the electrical protection element.

BRIEF DESCRIPTION OF THE DISCLOSURE

Embodiments of the disclosure are directed generally to an enclosure for housing an electrical network protection element.

According to one exemplary embodiment of the disclosure, an enclosure can include a housing, a flange, a first door, and a second door. The housing has an interior portion configured to accommodate an electrical network protection element. The flange can be attached to the housing and can include a first wedge projection that is located all along a perimeter of the flange and projecting away from the housing. The first door can be hingeably attached to a first vertical side of the flange and can include a first gasket that sealingly receives the first wedge projection of the flange when the first door is closed. The first gasket can include a first section disposed along an upper edge of the first door, a second section disposed along a lower edge of the first door, and a third section disposed along an outer vertical edge of the first door. The first door can further include a beveled inner edge having a second wedge projection. The second door is hingeably attached to a second vertical side the flange and can include a second gasket that sealingly males with the first wedge projection of the flange when the second door is closed. The second gasket can include a first section disposed along an upper edge of the second door, a second section disposed along a lower edge of the second door, a third section disposed along an outer vertical edge of the second door, and a fourth section disposed along a beveled inner edge of the second door, the fourth section of the second gasket arranged to sealingly receive the second wedge projection located in the beveled inner edge of the first door.

According to another exemplary embodiment of the disclosure, an enclosure can include a housing, a flange, a first door, and a second door. The housing has an interior portion configured to accommodate an electrical network protection element. The flange can be attached to the housing. The first door can be hingeably attached to a first vertical side of the flange and can include a first wedge projection along a beveled inner edge of the first door. The second door can be hingeably attached to a second vertical side of the flange and can include a first channel gasket along a beveled inner edge of the second door. The first channel gasket of the second door can be arranged to provide a compression sealing in cooperation with the first wedge projection in the beveled inner edge of the first door.

According to yet another exemplary embodiment of the disclosure, an enclosure can include a housing, a flange, a first door, and a toggle clamp. The housing has an interior portion configured to accommodate an electrical network protection element. The flange can be attached to the housing and includes a first wedge projection that is located all along a perimeter of the flange and projects away from the housing. The first door can be hingeably attached to a first vertical side of the flange and can include a first channel gasket that sealingly mates with the first wedge projection of the flange when the first door is closed. The first channel gasket can include a first section disposed along an upper edge of the first door, a second section disposed along a lower edge of the first door, and a third section disposed along an outer vertical edge of the first door. The toggle clamp can be attached to one of an upper internal surface or a lower internal surface of the first door and can be operable to engage with a catch located in the flange for sealingly compressing the first channel gasket of the first door against the first wedge projection on the flange.

Other embodiments and aspects of the disclosure will become apparent from the following description taken in conjunction with the following drawings.

BRIEF DESCRIPTION OF THE DRAWINGS

Figure 1:
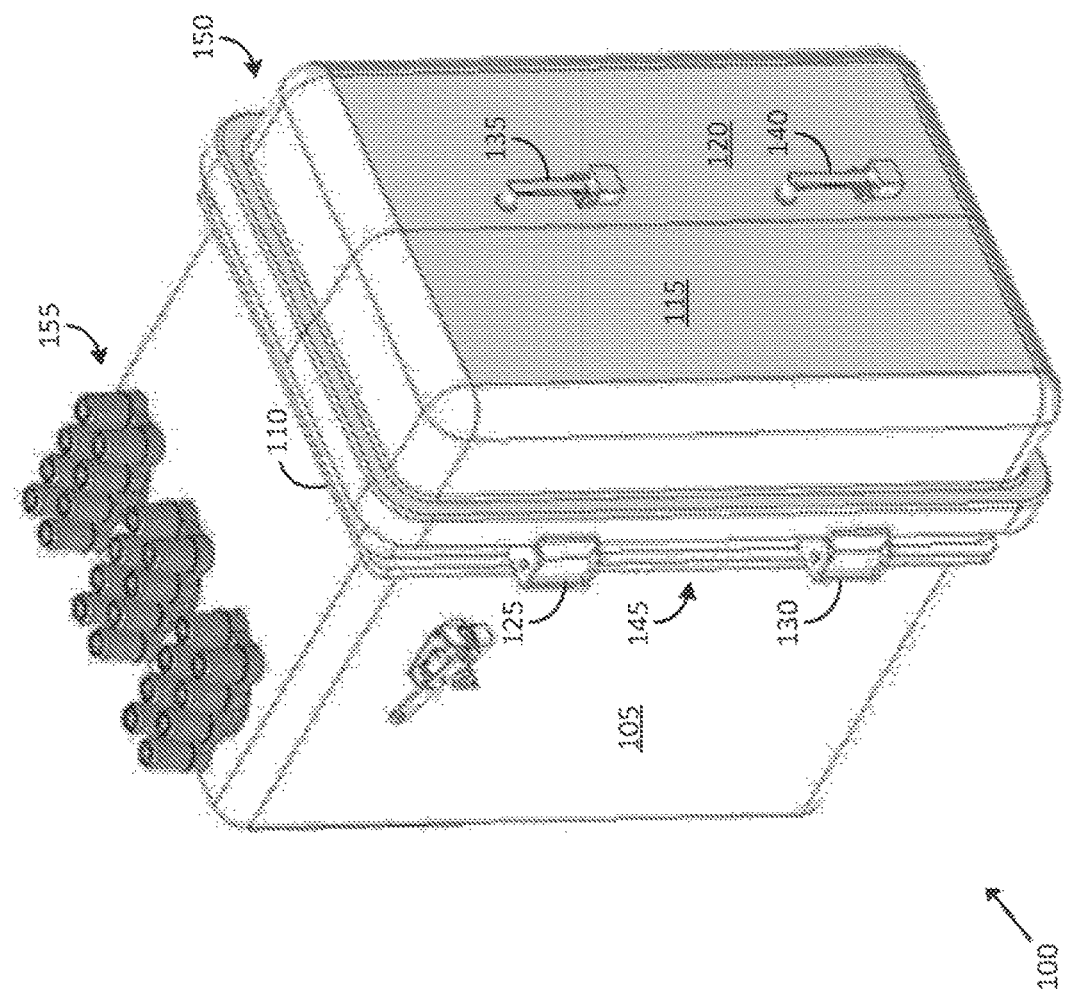

Having thus described the disclosure in general terms, reference will now be made to the accompanying drawings, which are not necessarily drawn to scale, and wherein:

FIG. 1 shows a perspective view of an exemplary enclosure that can house an electrical network protection element in accordance with an exemplary embodiment of the disclosure.

Figure 2:
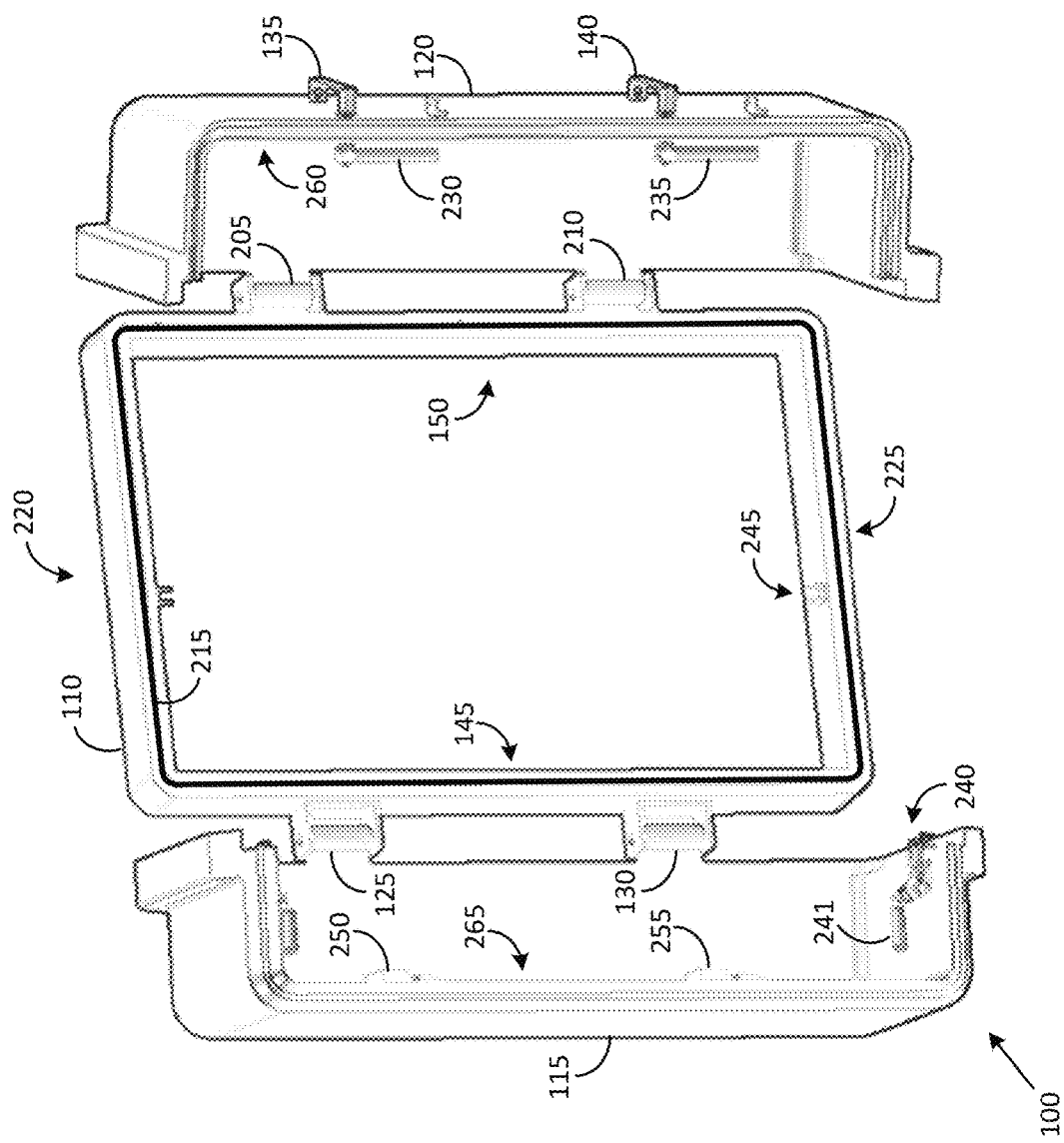

FIG. 2 shows a view of a flange when two doors of the exemplary enclosure shown in FIG. 1 are in an open position.

Figure 3:
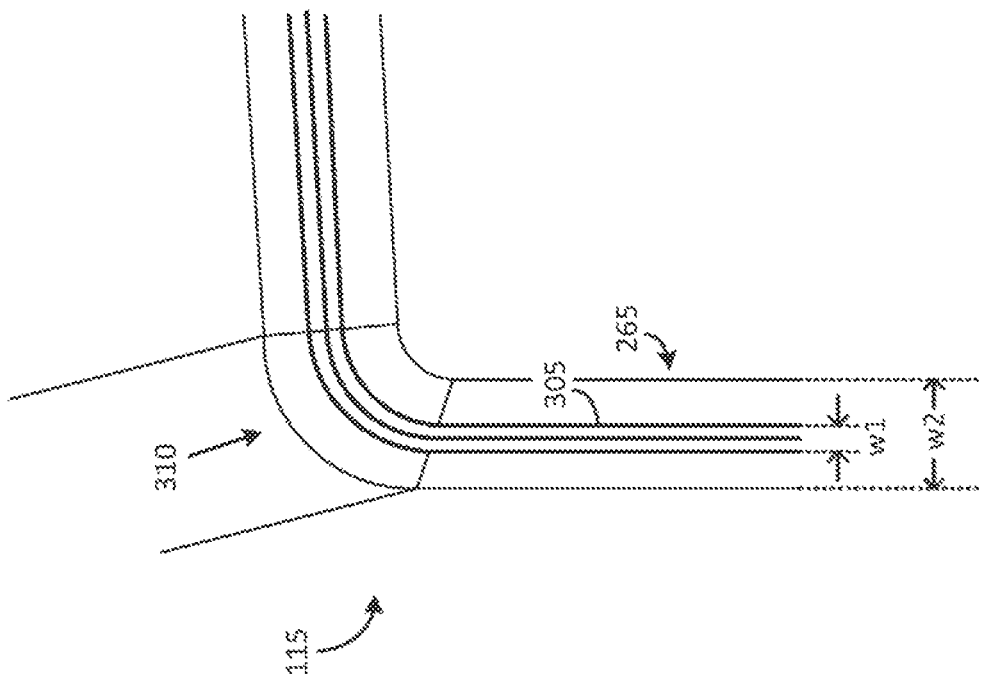

FIG. 3 shows a wedge projection in a beveled inner edge of a first door of the exemplary enclosure shown in FIG. 1.

Figure 4:
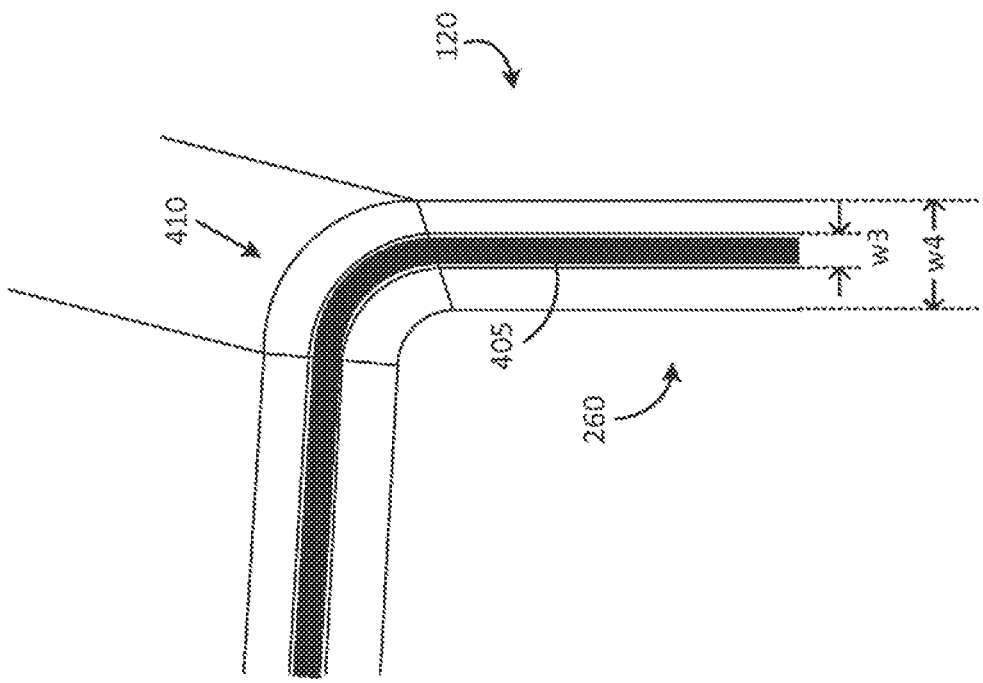

FIG. 4 shows a gasket disposed along a complementary beveled inner edge of a second door of the exemplary enclosure shown in FIG. 1.

Figure 5:
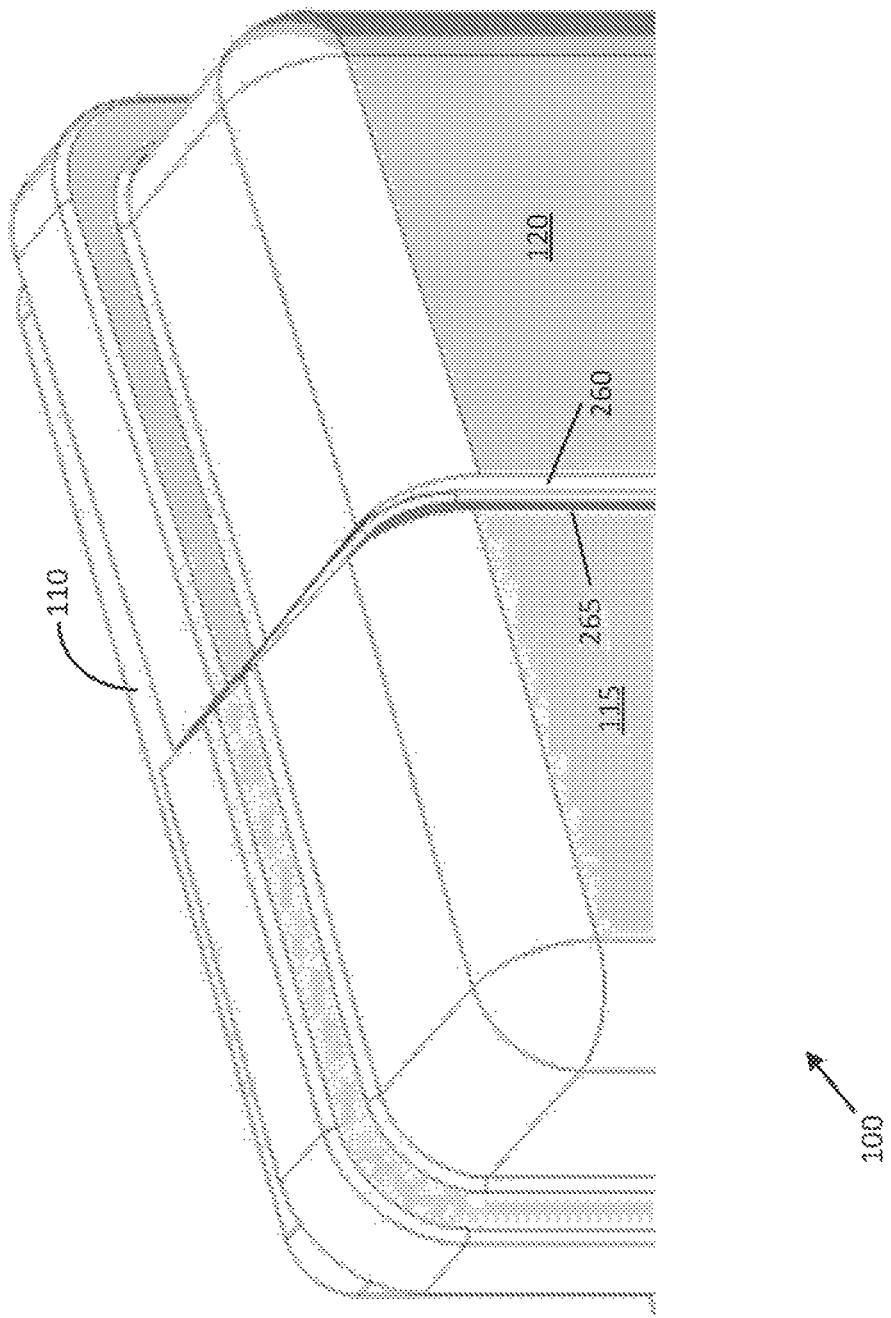

FIG. 5 shows the beveled inner edges of the two doors of the exemplary enclosure shown in FIG. 1 when in a partially closed position.

Figure 6:
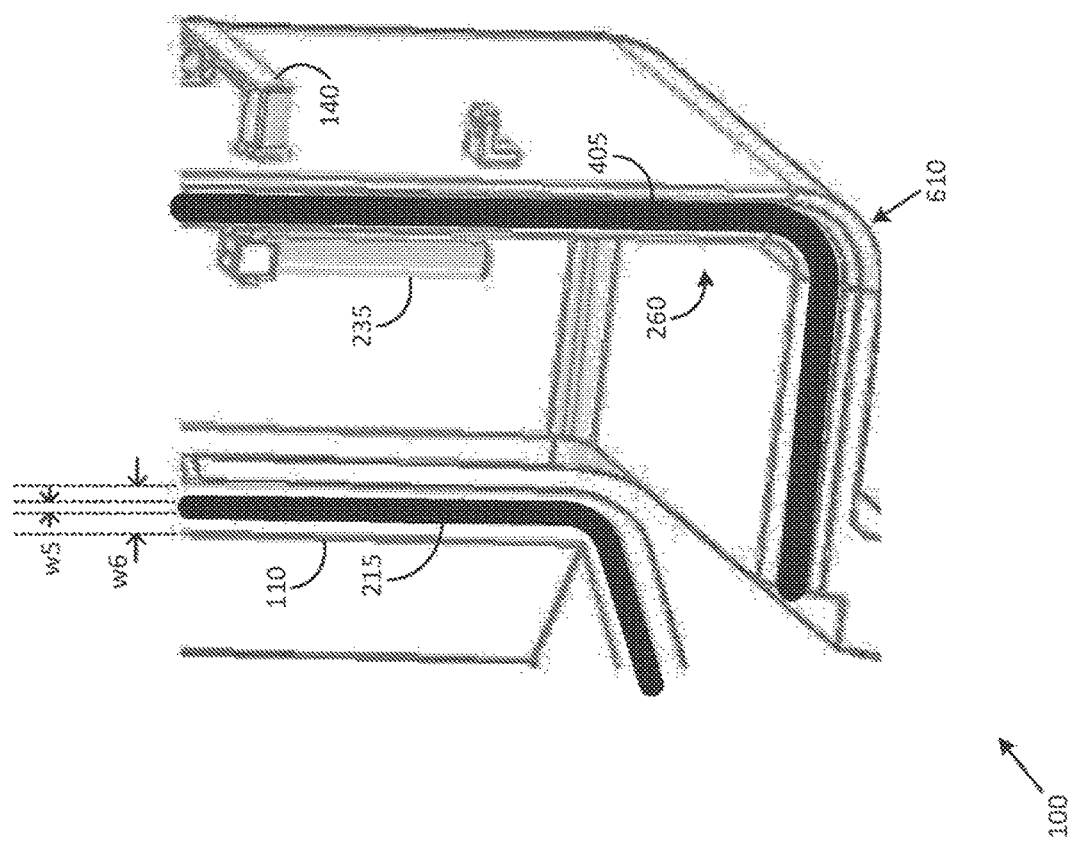

FIG. 6 shows an exemplary handle attached to the second door of the exemplary enclosure shown in FIG. 1.

Figure 7:
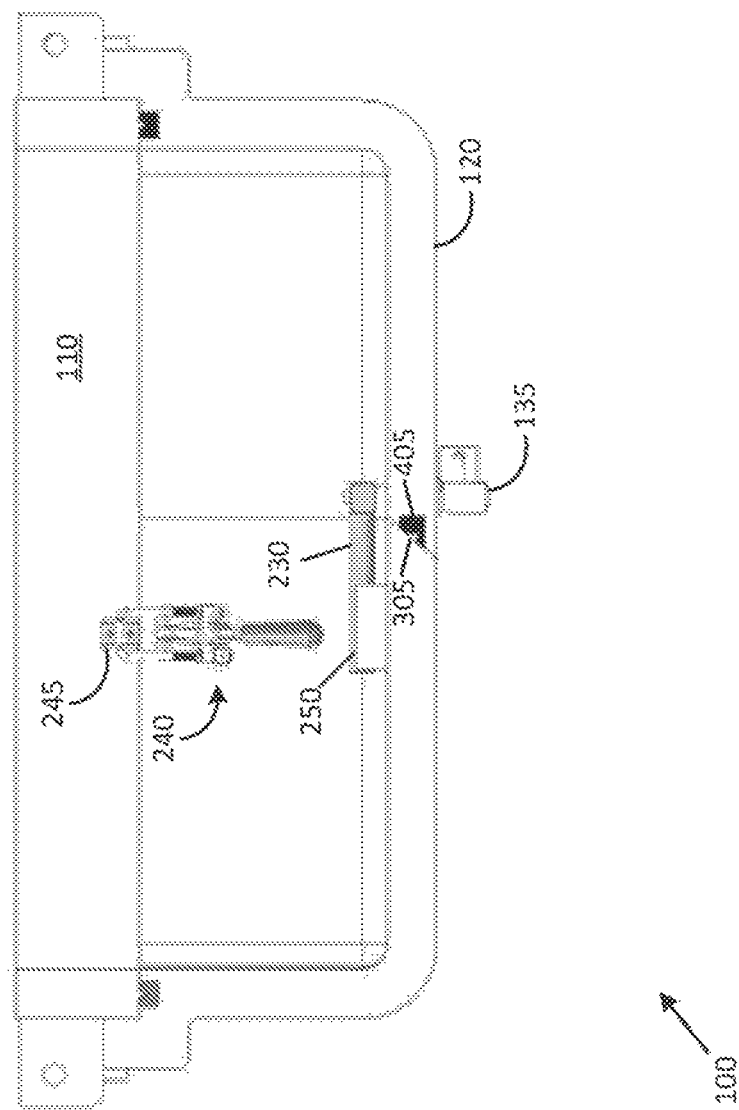

FIG. 7 shows an upper section view of an exemplary toggle clamp attached to an internal surface of the first door of the exemplary enclosure shown in FIG. 1.

Figure 8:
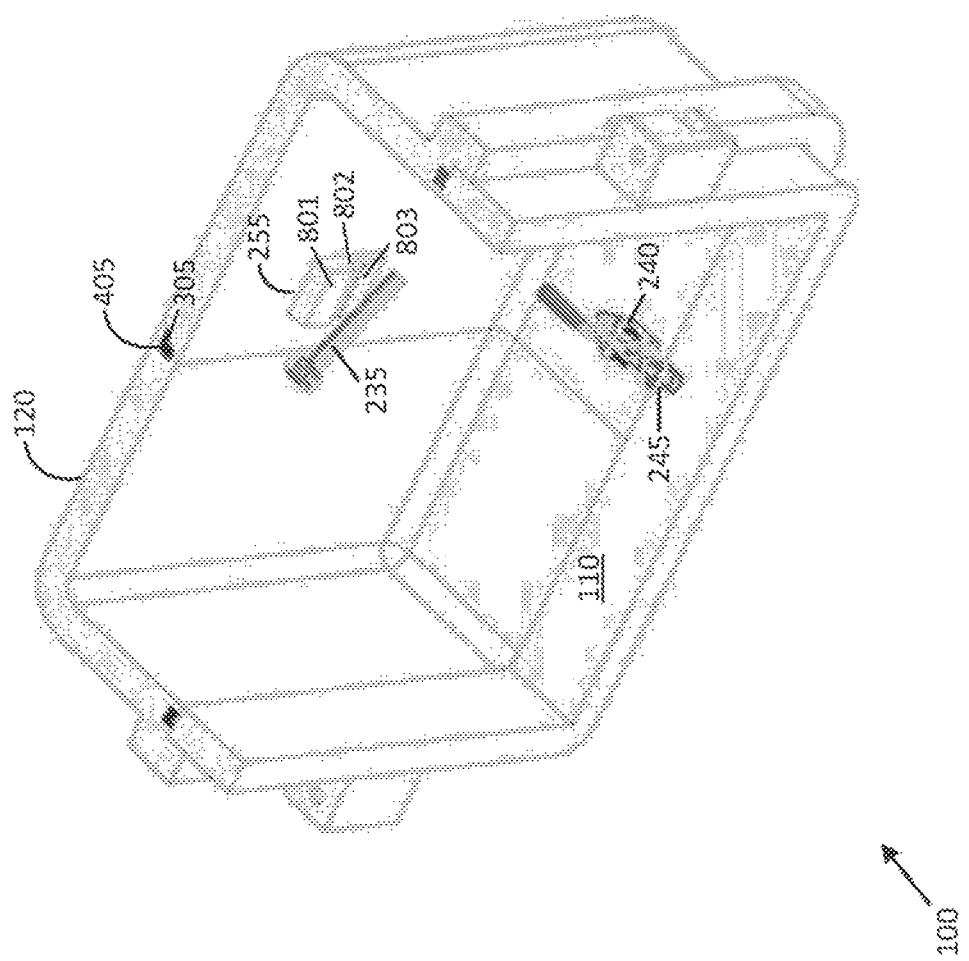

FIG. 8 illustrates a perspective view of a locking bar of the exemplary handle prior to being sealed in a groove in a wedge block on an internal major surface of a door of the exemplary enclosure shown in FIG. 1.

FIG. 9 illustrates the locking bar of the exemplary handle prior after being seated in the groove in the wedge block shown in FIG. 8.

DETAILED DESCRIPTION OF THE DISCLOSURE

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein rather, these embodiments are provided so that this disclosure will satisfy applicable legal requirements. Like numbers refer to like elements throughout. It should be understood that certain words and terms are used herein solely for convenience and such words and terms should be interpreted as referring to various objects and actions that are generally understood in various forms and equivalencies by persons of ordinary skill in the art. For example, the word "gasket" as used herein refers to any of various types of gaskets such as a sealing gasket a compression gasket, a race gasket, or a perimeter gasket. The phrase "wedge projection" as used herein may be alternatively understood as a "knife edge projection" or an "angular projection." It should also be understood that various words that pertain to an orientation, a mounting location, or a shape of an object (words such as "horizontal," "vertical," "upper" "lower," "right," and "left," for example) are used herein for describing one or more exemplary embodiments and should be interpreted as being equally applicable to other exemplary embodiments in terms of other orientations, locations, and shapes.

Furthermore, the description below may refer to a left-side door as a "first door" and a right-side door as a "second door." This is done solely for purposes of convenience and it should be understood that the various elements and operations described with respect to the first door and the second door in one example implementation are interchangeable in various other implementations. For example, a door handle that is described herein as being mounted on the second door in one example implementation can instead be mounted on the first door in an alternative implementation. A toggle clamp that is described as being attached to an internal surface of the first door in one example implementation can be attached to an internal surface of the second door in an alternative implementation. The dimensions of the two doors, and certain symmetrical features of the two doors, as shown in the figures is merely for illustrating some exemplary implementations. In other exemplary implementations, the two doors may have different shapes and dimensions (different widths, for example). The word "example" as used herein is intended to be non-exclusionary and non-limiting in nature. More particularly, the word "exemplary" as used herein indicates one among several examples, and it should be understood that no undue emphasis or preference is being directed to the particular example being described.

In terms of a general overview, described herein is an exemplary embodiment of an enclosure in accordance with the disclosure. The exemplary enclosure, includes a housing that can house an electrical network protection element and provides protection to the electrical network protection element against damage in various environments such as when the enclosure is placed in an underground vault that may be flooded during rain, or when a liquid (oil, for example) comes in contact with the enclosure. The enclosure includes a flange attached to the housing and two doors that are hingeably attached to the flange. A wedge projection is provided all along the perimeter of the flange and facing away from the housing. A gasket is provided on the outer three edges of each door, the gasket arranged to sealingly receive the wedge projection of the flange when the doors are closed against the flange. The first door also includes a beveled inner edge having a wedge projection that projects away from the housing. The second door includes a complementary beveled inner edge having a gasket that sealingly receives the wedge projection located in the beveled inner edge of the first door when the doors are closed against the flange. The exemplary enclosure may include additional elements such as a toggle clamp that is attached to an internal surface of the first door. When the toggle clamp is engaged with a catch located in the flange, the first door is automatically pulled towards the flange and sealingly compresses the gasket provided on the outer three edges of the door against the wedge projection provided along the perimeter of the flange.

FIG. 1 shows a perspective view of an exemplary enclosure 100 for an electrical network protection element (not shown), in accordance with an exemplary embodiment of the disclosure. The enclosure 100 is configured to provide waterproofing when completely submerged in water or when in contact with various types of liquids. The electrical network protection element is accommodated inside an interior portion of a housing 105 of the enclosure 100. In some implementations, air is evacuated from the interior portion of the housing 105 and replaced with an inert gas that helps prevent or minimize oxidation of various components of the electrical network protection element while also preventing or minimizing entry of water into the interior portion.

A flange 110 is attached to the housing 105 (by welding, for example) or can be manufactured as an integral part of the housing 105. The flange 110 can include a first knuckle 125 and a second knuckle 130, each of which is a part of a hinge. A first attachment element such as a bolt, a screw, or a pin, is inserted into the first knuckle 125 and a second attachment element is similarly inserted into the second knuckle 130 for hingeably attaching a first door 115 to a first vertical side 145 of the flange 110. Two other similar knuckles (205 and 210 shown in FIG. 2) may be used to hingeably attach a second door 120 to a second vertical side 150 of the flange 110. In other implementations, a single knuckle or more than two knuckles may be provided as parts of one or more hinges for hingeably attaching each of the first door 115 and the second door 120 to respective vertical sides of the flange 110.

The flange 110, which may be a square flange or a rectangular flange for example, has a wedge-shaped projection (shown in FIG. 2) located all along a perimeter of the flange 110 and projecting away from the housing 105. The wedge-shaped projection will be described below in more detail. The first door 115 includes a gasket (not shown) that sealingly receives the wedge projection of the flange 110 when the first door 115 is closed. The gasket, which is made of a compressible material, such as rubber, is operative as a watertight seal that prevents or minimizes water from entering the housing 105 via the upper edge, the lower edge, and the outer vertical edge of the first door 115. The gasket may include several sections that may be independent of each other or may be constituent parts of a unitary gasket.

Thus, in one exemplary implementation, the gasket can be a unitary gasket that extends along the three outer edges of the first door 115 (the upper edge, the lower edge, and the outer vertical edge). In another exemplary implementation, the gasket can include multiple sections. A first section of the gasket is disposed along an upper edge of the first door 115, a second section of the gasket is disposed along a lower edge of the first door 115, and a third section of the gasket is disposed along an outer vertical edge of the first door 115. The first door 115 further includes a beveled inner edge having a wedge-shaped projection that projects away from the housing and extends all along the beveled inner edge of the first door 115. The beveled inner edge of the first door 115 includes a vertical portion extending along the front vertical surface of the first door 115 and horizontal portions extending along the upper and lower horizontal surfaces of the first door 115.

The second door 120 includes a gasket (not shown) that sealingly receives the wedge-shaped projection of the flange 110 when the second door 120 is closed. The gasket, which is made of a compressible material, such as rubber, is operative as a watertight seal that prevents or minimizes water from entering the housing 105 via the upper edge, the lower edge, and the outer vertical edge of the second door 120. The gasket may include several sections that may be independent of each other or may be constituent parts of a unitary gasket.

Thus, in one exemplary implementation, the gasket can be a unitary gasket that extends along the three outer edges of the second door 120 (the upper edge, the lower edge, and the outer vertical edge). In another exemplary implementation, the gasket can include multiple sections. A first section of the gasket is disposed along an upper edge of the second door 120, a second section of the gasket is disposed along a lower edge of the second door 120, and a third section of the gasket is disposed along an outer vertical edge of the second door 120. The second door 120 further includes a beveled inner edge having a gasket (not shown) that sealingly mates with the wedge-shaped projection provided in the beveled inner of the first door 115 when the second door 120 is closed. The beveled inner edge of the second door 120 includes a vertical portion extending along the front vertical surface of the second door 120 and horizontal portions extending along the upper and lower horizontal surfaces of the second door 120.

One or more handles, such as a first handle 135 and a second handle 140 are mounted on a front external surface of the second door 120. Further details pertaining to these two handles are provided below.

A set of terminals 155 may be provided on an upper surface of the housing 105. One or more of the set of terminals 155, which can be connected via cable, bars, or wires to the network protection element inside the housing 105, may be used for connecting the network protection element to equipment (not shown) located outside the housing 105.

FIG. 2 shows a view of the flange 110 when both the first door 115 and the second door 120 are placed in an open position. The flange 110 includes the first vertical side 145, the second vertical side 150, an upper horizontal side 220, and a lower horizontal side 225. A wedge-shaped projection 215 is provided all along the perimeter of the flange 110 and facing away from the housing. A gasket that is provided on the outer three edges of the first door 115 sealingly receives the wedge-shaped projection 215 when the first door 115 is closed against the flange 110. The outer three edges of the first door 115 correspond to the first vertical side 145, a left-half portion of the upper horizontal side 220, and a left-half portion of the lower horizontal side 225 of the flange 110. Another gasket that is provided on the outer three edges of the second door 120 sealingly receives the wedge-shaped projection 215 when the second door 120 is closed against the flange 110. The outer three edges of the second door 120 correspond to the second vertical side 150, a right-half portion of the upper horizontal side 220, and a right-half portion of the lower horizontal side 225 of the flange 110.

The wedge-shaped projection 215 sealingly engages with the gasket in each of the first door 115 and the second door 120 to provide a waterproof seal along all four sides of the flange 110 for preventing or at least minimizing entry of water or other liquids into the interior portion of the housing 105.

As indicated above, the first door 115 is hingeably attached to the first vertical side 145 by using a first hinge that includes the first knuckle 125 and a second hinge that includes the second knuckle 130. The second door 120 is hingeably attached to the second vertical side 150 by similarly using a first hinge that includes a first knuckle 205 and a second hinge that includes a second knuckle 210.

The second door 120 also includes the first handle 135 and the second handle 140 mounted on a front external surface of the second door 120. The first handle 135 is shown as having a horizontal orientation that can correspond to a default condition when the second door 120 is in the open position. A locking rod 230 is coupled to the first handle 135 such that the locking rod 230 is oriented in a substantially orthogonal direction to the first handle 135. Consequently, the locking rod 230 has a vertical orientation (upwards or downwards in alternative exemplary implementations) when the first handle 135 is oriented horizontally. The locking rod 230 can be coupled to the first handle 135 in other angular orientations in other exemplary implementations. The structure and operation of the second handle 140 can be similar to the first handle 135.

A toggle clamp 240 can be attached to a lower internal surface of the first door 115. In an alternative exemplary implementation, the toggle clamp 240 can be attached to an upper internal surface of the first door 115. The toggle clamp 240 includes a handle 241 that can be operated manually to engage the toggle clamp 240 with a catch 245 that is located in the flange 110. In an exemplary operation, the second door 120 is left in the open position and the first door 115 is swung shut to an initial closed position wherein the gasket along the three edges of the first door 115 comes in contact with a corresponding portion of the wedge-shaped projection 215 in the flange 110. A human operator (a technician, for example) then reaches in through the opening where the second door 120 is open and flips the handle 241 in the first door 115 towards the catch 245. In one exemplary implementation, the toggle clamp 240 is an adjustable toggle clamp that allows the handle 241 to be engaged with the catch 245. The action of manually flipping the handle 241 and engaging with the catch 245 pulls the first door 115 towards the flange 110 and sealingly compresses the gasket in the first door 115 against the corresponding portion of the wedge-shaped projection 215 in the flange 110.

The second door 120 can now be closed after having closed and sealed the first door 115. Closing the second door 120 can be carried out in two operations. In the first operation, the second door 120 is swung shut to an initial closed position wherein the gasket along the three edges in the second door 120 comes in contact with a corresponding portion of the wedge-shaped projection 215 in the flange 110. In the second operation, the first handle 135 is manually operated (by the technician, for example) to move the first handle 135 from the horizontal orientation to a vertical orientation (upwards or downwards in alternative exemplary implementations). The locking rod 230 that is coupled to the first handle 135 correspondingly moves from the vertical orientation to a horizontal orientation. In doing so, the locking rod 230 comes in contact with one of two sloping contact surfaces located on either side of a groove in a wedge-shaped block 250 that is located on an internal major surface of the first door 115. Each sloping contact surface is configured to provide a continuously incremental amount of pushing force that compressingly pushes the gasket along the three edges in the second door 120 against the corresponding portion of the wedge-shaped projection 215 in the flange 110 until the locking rod is seated in the groove in the wedge block. This aspect is described below in more detail using other figures.

The second step of manually operating the first handle 135 also provides for a sealed closure of a beveled inner edge 260 of the second door 120 with a beveled inner edge 265 of the first door 115. The beveled inner edge 265 of the first door 115 includes a wedge-shaped projection 305 (shown in FIG. 3) that projects towards the beveled inner edge 260 of the second door 120. The beveled inner edge 260 of the second door 120 includes a gasket 405 (shown in FIG. 4) arranged to sealingly receive the wedge-shaped projection located in the first door 115, when the second door 120 is closed and the first handle 135 is operated.

It should be understood that the second handle 140 can be operated in a manner similar to that described above with reference to first handle 135. The locking rod 235 coupled to the second handle 140 engages a wedge-shaped block 255 that can be similar to the wedge-shaped block 250.

FIG. 3 shows the wedge-shaped projection 305 in the beveled inner edge 265 of the first door 115. The beveled inner edge 265 can have a bevel angle such as about 45 degrees with respect to external major surfaces (front, upper, and lower surfaces) of the first door 115. The beveled inner edge 265 can also can include chamfers at the corners, such as a chamfered corner 310 where a front major surface of the first door 115 meets the upper major surface of the first door 115. In one exemplary implementation, the width "w1" of the wedge-shaped projection 305 provided along the beveled inner edge 265 can be less than the thickness "w2" of the first door 115. In another exemplary implementation, the width "w1" of the wedge-shaped projection 305 provided along the beveled inner edge 265 can be substantially equal to the thickness "w2" of the first door 115.

FIG. 4 shows the gasket 405 disposed along the beveled inner edge 260 of the second door 120. The gasket 405 is arranged to sealingly receive the wedge-shaped projection 305 located in the first door 115, when the second door 120 is closed and one or both of the first handle 135 and the second handle 140 is operated. The bevel angle of the beveled inner edge 260 of the second door 120 is configured to complement the bevel angle of the beveled inner edge 265 of the first door 115. Consequently, when the beveled inner edge 265 of the first door 115 has a bevel angle of about 45 degrees, the beveled inner edge 260 of the second door 120 is also selected to have a bevel angle of about 45 degrees. The beveled inner edge 260 can also can include chamfers at the corners, such as a chamfered corner 410 where a front major surface of the second door 120 meets the upper major surface of the second door 120.

In one exemplary implementation, the width "w3" of the gasket 405 provided along the beveled inner edge 260 can be less than the thickness "w4" of the second door 120. In another exemplary implementation, the width "w3" of the gasket 405 can be substantially equal to the thickness "w4" of the second door 120.

The gasket 405 can be one of many types of gaskets and can be disposed along the beveled inner edge 260 of the second door 120 in various ways, such as by using a channel gasket that is disposed in a channel, or by using a sealing gasket that is attached to the beveled inner edge 260 by using an adhesive.

FIG. 5 shows the beveled inner edge 260 of the second door 120 next to the beveled inner edge 265 of the first door 115 as the second door 120 is moved to a partially closed position after the first door 115 is closed and sealed by operating the toggle clamp 240. The gap that is seen between the beveled inner edge 260 of the second door 120 next and the beveled inner edge 265 of the first door 115 is closed and compressively sealed after the second door 120 is fully closed and one or both of the first handle 135 and the second handle 140 is operated. When compressively sealed, the wedge-shaped projection 305 (shown in FIG. 3) provided along the beveled inner edge 265 of the first door 115 compressively mates with the gasket 405 (shown in FIG. 4) located in the beveled inner edge 260 of the second door 120.

FIG. 6 shows a close-up view of the second handle 140 that is attached to the second door 120. The locking rod 235 is pointing downwards because the second handle 140 is in the default condition when the second door 120 is in the open position. The portion of the beveled inner edge 260 that is shown in FIG. 6 includes a chamfered corner 610 where a front major surface of the second door 120 meets the lower major surface of the second door 120. Also shown, is a portion of the wedge-shaped projection 215 that is provided all along the perimeter of the flange 110 that is attached to the housing 105.

FIG. 7 shows an upper section view of the exemplary toggle clamp 240 attached to an internal surface of the first door 115. As shown, the toggle clamp 240 is engaged with the catch 245 that is provided in the flange 110. Also shown, is the door handle 135 in a position where the second door 120 is in the closed position and the locking rod 230 is seated in the groove in the wedge-shaped block 250 provided in the first door 115. In an alternative exemplary implementation, the door handle 135 can be located on the first door 115 and the wedge-shaped block 250 can be located on the second door 120. Similarly, the toggle clamp 240 can be provided in the second door 120 instead of the first door 115 and the catch 245 aligned accordingly in the flange 110. When so provided, the second door 120 is closed first, followed by manually operating the toggle clamp 240 to engage with the catch 245. (The first door 115 can then be closed and sealed by operating one or more door handles such as the door handle 135 located on the first door 115.

FIG. 8 illustrates a perspective view of the locking bar 235 of the second handle 140 that is mounted on the front external surface of the second door 120 according to an exemplary embodiment of the disclosure. An upwards movement of the second handle 140 initiated by a technician (not shown) for locking the second door 120 causes the locking bar 235 to come in contact with a bottom end of a first sloping contact surface 803 of the wedge block 255. The first sloping contact surface 803 is configured to provide a continuously incremental amount of pushing force that compressingly pushes the gasket 405 disposed along the beveled inner edge 260 of the second door 120 against the wedge-shaped projection 305 in the beveled inner edge 265 of the first door 115 until the locking rod 235 engages with the groove 802 in the wedge block 255.

Alternatively, when the second handle 140 is configured to be moved downwards for locking the second door 120, a downwards movement of the second handle 140 initiated by the technician (not shown) for locking the second door 120 causes the locking bar 235 to come in contact with an upper end of a second sloping contact surface 801 of the wedge block 255. The second sloping contain surface 801 is configured to provide a continuously incremental amount of pushing force that compressingly pushes the gasket 405 disposed along the beveled inner edge 260 of the second door 120 against the wedge-shaped projection 305 in the beveled inner edge 265 of the first door 115 until the locking rod 235 engages with the groove 802 in the wedge block 255.

In another exemplary implementation, the wedge block 255 can have a single sloping contact surface (one that is either above or below the groove 802) and the second handle 140 configured to be moved only upwards or downwards correspondingly. FIG. 8 also illustrates the toggle clamp 240 (attached to a lower internal surface of the first door 115) engaged with the catch 245 located in the flange 110.

FIG. 9 illustrates the locking bar 235 of the second handle 140 seated in the groove 802 in the wedge block 255 shown in FIG. 8. When so seated, the second door 120 is in a locked condition.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the exemplary embodiments described above Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An enclosure comprising:
   a housing having an interior portion configured to accommodate an electrical network protection element;
   a flange attached to the housing, the flange comprising a first wedge projection that is located all along a perimeter of the flange and projects away from the housing;
   a first door hingeably attached to a first vertical side of the flange, the first door including a first channel gasket that sealingly mates with the first wedge projection of the flange when the first door is closed, the first channel gasket comprising a first channel gasket first section disposed along an upper edge of the first door, a first channel gasket second section disposed along a lower edge of the first door, and a first channel gasket third section disposed along an outer vertical edge of the first door;
   a second door hingeably attached to a second vertical side of the flange, the second door including a second channel gasket that sealingly mates with the first wedge projection of the flange when the second door is closed, the second channel gasket comprising a first section disposed along an upper edge of the second door, a second section disposed along a lower edge of the second door, and a third section disposed along an outer vertical edge of the second door; and
   a toggle clamp attached to one of an upper internal surface or a lower internal surface of the first door, the toggle clamp operable to engage with a catch located in the flange and sealingly compress the first channel gasket of the first door against the first wedge projection on the flange.

2. The enclosure of claim 1, wherein the first door includes a first beveled inner edge having a second wedge projection that is located along an entire length of the first beveled inner edge, and wherein the second door includes a second beveled inner edge housing a fourth section of the second channel gasket, the fourth section of the second channel gasket arranged to sealingly mate with the second wedge projection in the first beveled inner edge of the first door when the first door and the second door are closed.

3. The enclosure of claim 2, wherein the toggle clamp is operable to engage with a catch located in the flange and sealingly compress the first channel gasket of the first door against the first wedge projection on the flange after the first door is closed and prior to closing of the second door.

4. The enclosure of claim 3, further comprising:
   a wedge block on an internal major surface of the first door; and
   a first door handle on a front external surface of the second door, the first door handle comprising a locking rod coupled to the first door handle, the locking rod configured to move to a horizontal position and engage with a groove in the wedge block when the first door handle is rotated to a downwards position for locking the second door after closing.

5. The enclosure of claim 4, wherein the wedge block has a sloping contact surface that makes contact with the locking rod when the first door handle is rotated to the downwards position, the sloping contact surface configured to provide a continuously incremental amount of pushing force that compressingly pushes the fourth section of the second channel gasket in the second door against the second wedge projection located in the first beveled inner edge of the first door until the locking rod engages with the groove in the wedge block.

\* \* \* \* \*